United States Patent
Yun et al.

(10) Patent No.: US 8,452,300 B2
(45) Date of Patent: May 28, 2013

(54) COMMUNICATION SYSTEM INCLUDING A FEMTO BASE STATION AND A COMMUNICATION TERMINAL, AND A COMMUNICATION METHOD THEREOF

(75) Inventors: Yu Suk Yun, Seoul (KR); Dong Hee Kang, Seoul (KR); Dae Whan Back, Seoul (KR); Dae Ryong Lee, Suwon-si (KR); Kwang Jin Ahn, Suwon-si (KR); Byung Wan Yu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 364 days.

(21) Appl. No.: 12/715,830

(22) Filed: Mar. 2, 2010

(65) Prior Publication Data

US 2010/0222070 A1 Sep. 2, 2010

(30) Foreign Application Priority Data

Mar. 2, 2009 (KR) .................. 10-2009-0017390

(51) Int. Cl.
*H04W 72/00* (2009.01)

(52) U.S. Cl.
USPC ............ 455/452.2; 455/428; 455/24; 455/25; 455/41.2; 455/500; 455/63.4; 455/82; 455/83; 455/92

(58) Field of Classification Search
USPC .............. 455/452.2, 428, 24, 25, 41.2, 500, 455/63.4, 82, 83, 92; 370/334, 335
See application file for complete search history.

(56) References Cited

U.S. PATENT DOCUMENTS

| | | | |
|---|---|---|---|
| 6,728,233 B1 | 4/2004 | Park et al. | |
| 7,590,399 B2* | 9/2009 | Shatara et al. | 455/272 |
| 2003/0087673 A1* | 5/2003 | Walton et al. | 455/562 |
| 2004/0160921 A1* | 8/2004 | Kaipainen et al. | 370/335 |
| 2004/0224725 A1* | 11/2004 | Kim et al. | 455/561 |
| 2006/0146755 A1* | 7/2006 | Pan et al. | 370/334 |
| 2009/0279630 A1* | 11/2009 | Ma et al. | 375/267 |
| 2010/0104033 A1* | 4/2010 | Gorokhov | 375/260 |

FOREIGN PATENT DOCUMENTS

| | | |
|---|---|---|
| KR | 1020000011799 | 2/2000 |
| KR | 1020030007481 | 1/2003 |
| KR | 1020060113755 | 11/2006 |
| WO | WO 01/76110 | 10/2001 |

* cited by examiner

*Primary Examiner* — Jinsong Hu
*Assistant Examiner* — Michael Nguyen
(74) *Attorney, Agent, or Firm* — The Farrell Law Firm, P.C.

(57) ABSTRACT

Apparatuses and methods of transmitting a signal with reduced interference in a femto base station including a plurality of antennas having different radiation patterns are provided. A method includes transmitting common information through the plurality of antennas having the different radiation patterns; receiving feedback information corresponding to the common information; analyzing the feedback information; temporarily selecting one of the plurality of antennas as a transmission antenna, based on a result of the analyzing; and transmitting user information through the transmission antenna.

12 Claims, 8 Drawing Sheets

COMMUNICATION SYSTEM INCLUDING A FEMTO BASE STATION AND A COMMUNICATION TERMINAL, AND A COMMUNICATION METHOD THEREOF

PRIORITY

This application claims priority under 35 U.S.C. §119(a) to a Korean Patent Application, which was filed on Mar. 2, 2009 and assigned Korean Patent Application No. 10-2009-0017390, the content of which is incorporated herein by reference.

BACKGROUND OF THE INVENTION

1. Field of the Invention

The present invention relates generally to a communication system and a communication method thereof, and more particularly, to a communication system including a femto base station having a plurality of antennas and a communication terminal, and a communication method thereof.

2. Description of the Related Art

Generally, communication system includes of a plurality of macro cells. The macro cells are each administrated by a macro base station that provides a communication service to communication terminals within the corresponding macro cell.

Currently, a signal environment for each communication terminal is changeable in a specific macro cell, but a macro base station cannot afford to consider signal environment for each communication terminal when providing communication service. Consequently, the quality of the communication service may deteriorate and delays may occur with the communication service.

To remedy this problem, a mediation device, such as a repeater or a remote unit, can be installed between a macro base station and a communication terminal in a communication system. However, the macro base station and the mediation device are installed by a service provider, which increases communication system costs of the service provider. Additionally, it is often difficult to connect a macro base station to a mediation device in communication system.

Therefore, a proposed solution to overcome the above-described problems, is installing a femto base station within a macro cell, independent from the macro base station in communication system. A femto base station is a home base station that is installed, e.g., at home or office, depending on user need.

For example, a femto cell can be ubicell for a Wideband Code Division Multiple Access (WCDMA) High Speed Packet Access (HSPA) standard. This type of femto cell improves a signal environment of communication terminals within a cell area of the femto base station and improves the quality of a communication service without any additional cost for service providers.

However, by adding an independent femto base station, the signals of macro base station and femto base station may interfere with each other. Further, signals of femto base stations may also interfere with signals of a communication terminal.

For example, a femto base station sends and receives a signal through an antenna having an omni-directional radiation pattern, so that a communication terminal located within a femto cell of the femto base station may simultaneously receive a signal of the femto base station and macro base station, which can generate interference. Further, signals of the communication terminal may also experience interference from received signals of other femto base stations.

SUMMARY OF THE INVENTION

Accordingly, the present invention has been designed to address at least the above-described problems, and provides a communication method and a communication system including a macro base station, a femto base station, and a communication terminal, wherein interference between the macro base station, the femto base station, and the communication terminal is reduced.

In accordance with an aspect of the present invention, a method of transmitting a signal with reduced interference in a femto base station including a plurality of antennas having different radiation patterns is provided. The method includes transmitting common information through the plurality of antennas having the different radiation patterns; receiving feedback information corresponding to the common information; analyzing the feedback information; temporarily selecting one of the plurality of antennas as a transmission antenna, based on a result of the analyzing; and transmitting user information through the transmission antenna.

In accordance with another aspect of the present invention, a method of receiving a signal with reduced interference by a communication terminal. The method includes receiving common information from a femto base station including a plurality of antennas having different radiation patterns for transmitting the common information through a plurality of downlink paths; calculating a Signal to Interference and Noise Ratio (SINR) of the common information; detecting a downlink path having a maximum SINR of the common information from among the downlink paths; transmitting feedback information to the femto base station, indicating the detected downlink path having the maximum SINR; receiving user information from the femto base station through the detected downlink path; calculating an SINR of the user information; determining whether the detected downlink path is suitable by comparing the SINR of the common information with the SINR of the user information; and transmitting suitability information to the base station, indicating whether or not the detected downlink path is suitable.

In accordance with another aspect of the present invention, an apparatus for transmitting a signal with reduced interference in a femto cell is provided. The apparatus includes a plurality of antennas having different radiation patterns; a transmitter that generates common information and user information; and a controller that transmits the common information through the plurality of antennas, analyzes feedback information in response to the common information, temporarily selects one of the plurality of antennas as a transmission antenna based on the feedback information, and transmits user information through the transmission antenna.

In accordance with another aspect of the present invention, an apparatus for receiving a signal with reduced interference in a femto cell of a communication system is provided. The apparatus includes an antenna that receives common information from a transmission device through a plurality of downlink paths and receives user information through one of the plurality of downlink paths; a receiver that processes the common information and the user information; and a controller that calculates a Signal to Interference and Noise Ratio (SINR) of the common information, detects a downlink path having a maximum SINR of the common information from among the downlink paths, transmits feedback information indicating the downlink path having the maximum SINR to the transmission device, calculates an SINR of the user information, determines whether the detected downlink path is suitable by comparing the SINR of the common information with the SINR of the user information, and transmits, to the transmission device, suitability information indicating whether the detected downlink path is suitable.

Accordingly, a femto base station transmits user information for a communication terminal through an antenna having a radiation pattern of a specific directivity, thereby reducing interference that may conventionally be caused through transmission of the user information. Hence, the quality deterioration of the communication service can be suppressed in the communication system.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Various embodiments of the present invention are described in detail herein below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

Hereinafter, "common information" refers to a signal that is sent without a predefined object. For example, the common information sent from a femto base station to a communication terminal can be a pilot signal, a paging signal, and a broadcast signal. In addition, the common information sent from a communication terminal to a femto base station can be a random access channel. Further, "user information" refers to a signal for a predefined object.

Figure 1:
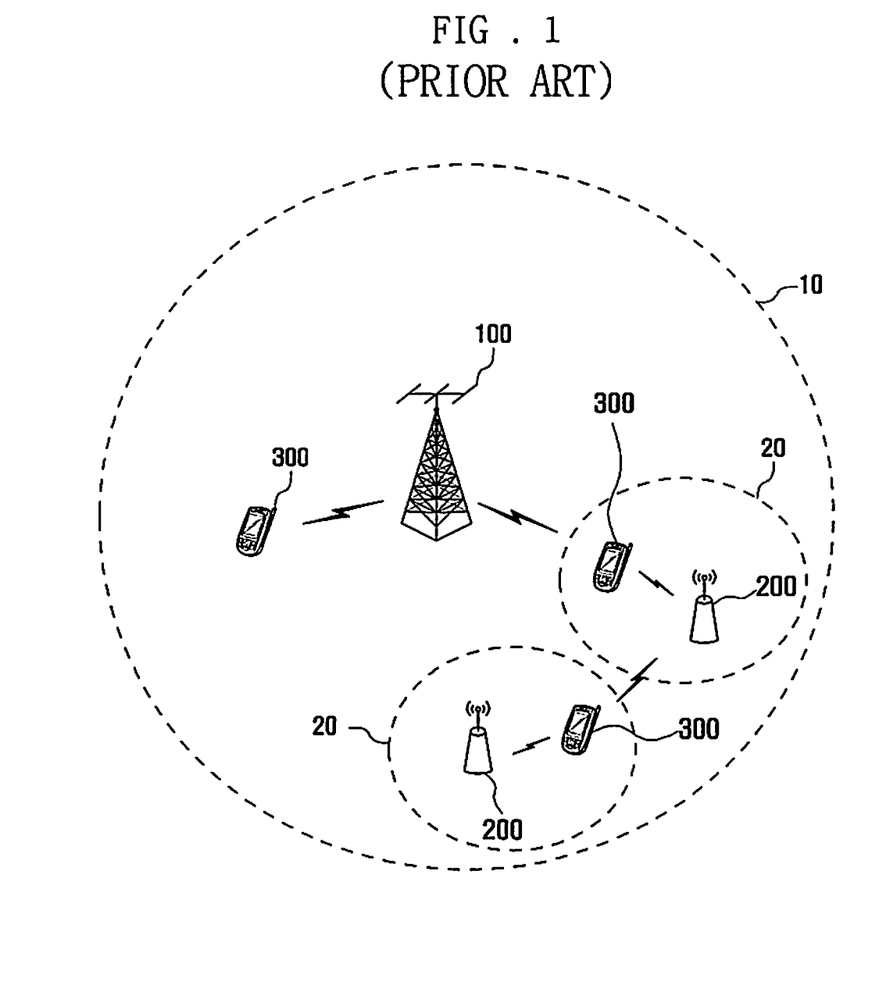
FIG. 1 is a diagram illustrating a conventional communication system including femto cells.

FIG. 1 is a diagram illustrating a conventional communication system including femto cells.

Referring to FIG. 1, the communication system includes a macro cell 10. Within the macro cell 10, the communication system includes a macro base station 100 for administrating the macro cell 10, a plurality of femto base stations 200 for controlling femto cells 20 within the macro cell 10, and a mobile communication terminal 300 that moves inside and outside of the macro cell 10 or the inside and outside of the femto cells 20.

Upon entering the macro cell 10, the communication terminal 300 connects with the macro base station 100. Further, upon entering a femto cell 20 within the macro cell 10, the communication terminal 300 connects with the femto base station 200 of the femto cell 20. Here, the communication terminal 300 may be previously registered so as to communicate with the femto base station 200. Accordingly, the communication terminal 300 can use a communication service through the macro base station 100 or the femto base station 200.

Figure 2:
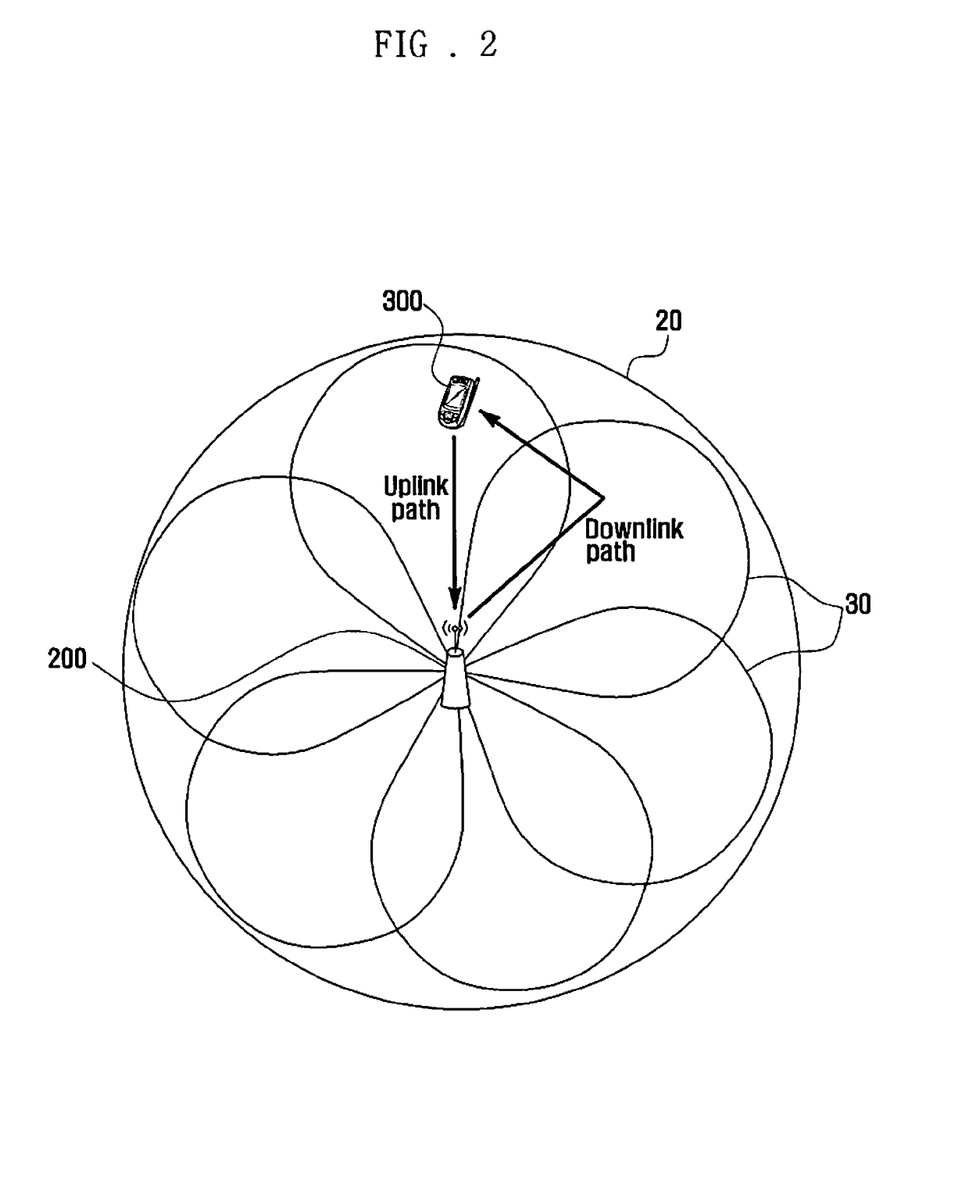
FIG. 2 is a diagram illustrating a femto cell according to an embodiment of the present invention.

FIG. 2 is a diagram illustrating a femto cell according to an embodiment of the present invention.

Referring to FIG. 2, the femto cell 20 includes a plurality of service areas 30. For example, when the femto cell 20 is circular, the femto cell 20 may include three service areas 30 corresponding to 120° based on the femto cell 20. As another example, as illustrated in FIG. 2, the femto cell 20 may include six service areas 30 corresponding to 60° based on the femto cell 20.

The femto base station 200 provides a communication service to at least one of the service areas 30, and communicates with the communication terminal 300 in the service area 30 to provide the communication service. That is, the femto base station 200 provides a communication service to each service area 30, in order to provide communication services to the femto cell 20 as a whole.

A service area 30 for providing a communication service by the femto base station 200 to the communication terminal 300 may be different from an actual service area 30 in which the communication terminal 300 is located. More specifically, between the femto base station 200 and the communication terminal 300, a downlink path of a signal transmitted from the femto base station 200 can be provided in a service area 30 that is different from a service area 30 for an uplink path of a signal received in the femto base station 200, because, e.g., according to the WCDMA HSPA standard of Frequency Division Duplex (FDD) method, channels of signals received and transmitted by the femto base station 200 are separated in view of frequency. In other words, the service area 30 of a current location of the communication terminal 300 may correspond to the uplink path, but may not correspond to the downlink path. Consequently, the quality of the communication service provided from the femto base station 200 to the communication terminal 300 can be deteriorated.

Figure 3:
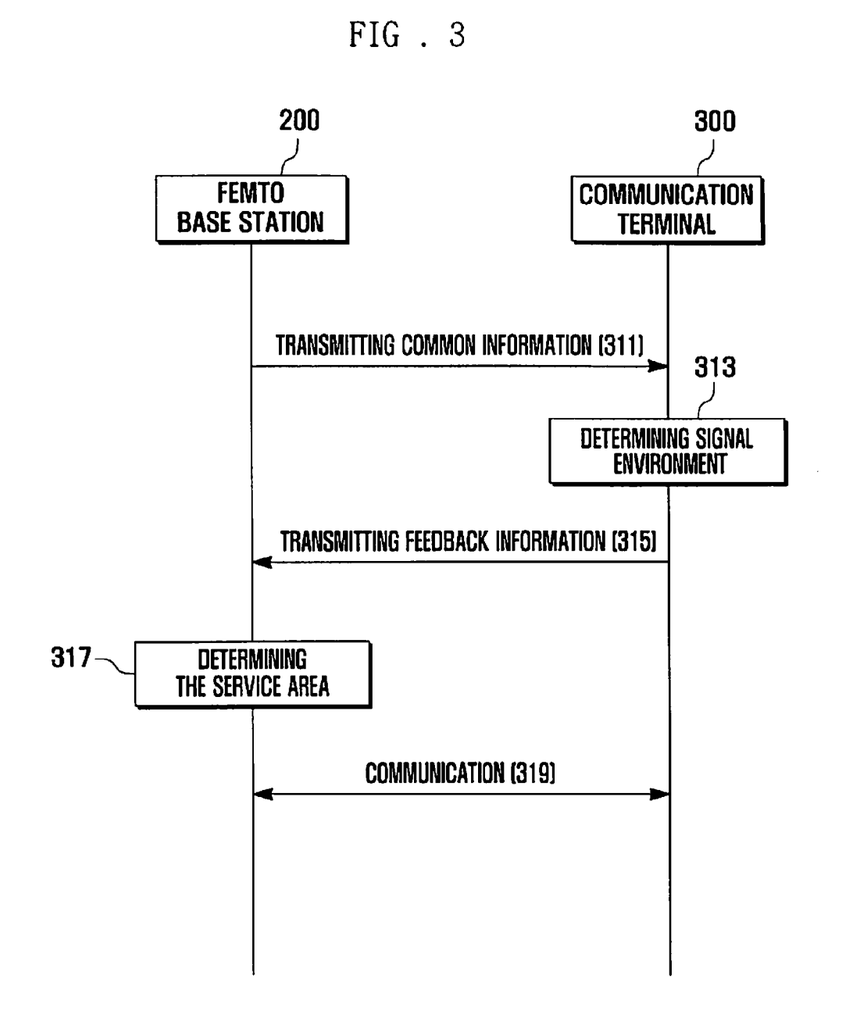
FIG. 3 is a flow chart illustrating a signal flow procedure in a communication system according to an embodiment of the present invention.

FIG. 3 is a flow chart illustrating a signal flow procedure in a communication system according to an embodiment of the present invention.

Referring to FIG. 3, a femto base station 200 transmits common information in step 311. More specifically, the femto base station 200 transmits the common information to the femto cell 20, i.e., to all service areas 30. For example, the femto base station 200 can transmit the common information by using channel information, which is different according to each service area 30, e.g., Channel State Information (CSI), Precoding Matrix Information (PMI), and Precoding Control Indicator (PCI).

In step 313, when a communication terminal 300 in one of the service areas 30 receives the common information, the communication terminal 300 determines a signal environment of the common information.

More specifically, the communication terminal 300 determines a Signal to Interference and Noise Ratio (SINR) of the common information, and channel information corresponding to the common information. The communication terminal 300 can then determine optimum channel information. For example, the communication terminal 300 may determine that the channel information corresponding to the common information having a maximum SINR is optimal.

In step 315, the communication terminal transmits feedback information having optimum channel information. In step 317, upon receiving the feedback information, the femto base station 200 analyzes the feedback information and determines the service area 30 for communicating with the communication terminal 300. More specifically, the femto base station 200 determines the service area 30 using the channel information of the feedback information.

In step 319, the femto base station 200 communicates with the communication terminal 300, i.e., the femto base station 200 transmits user information to a corresponding service area 30.

Figure 4:
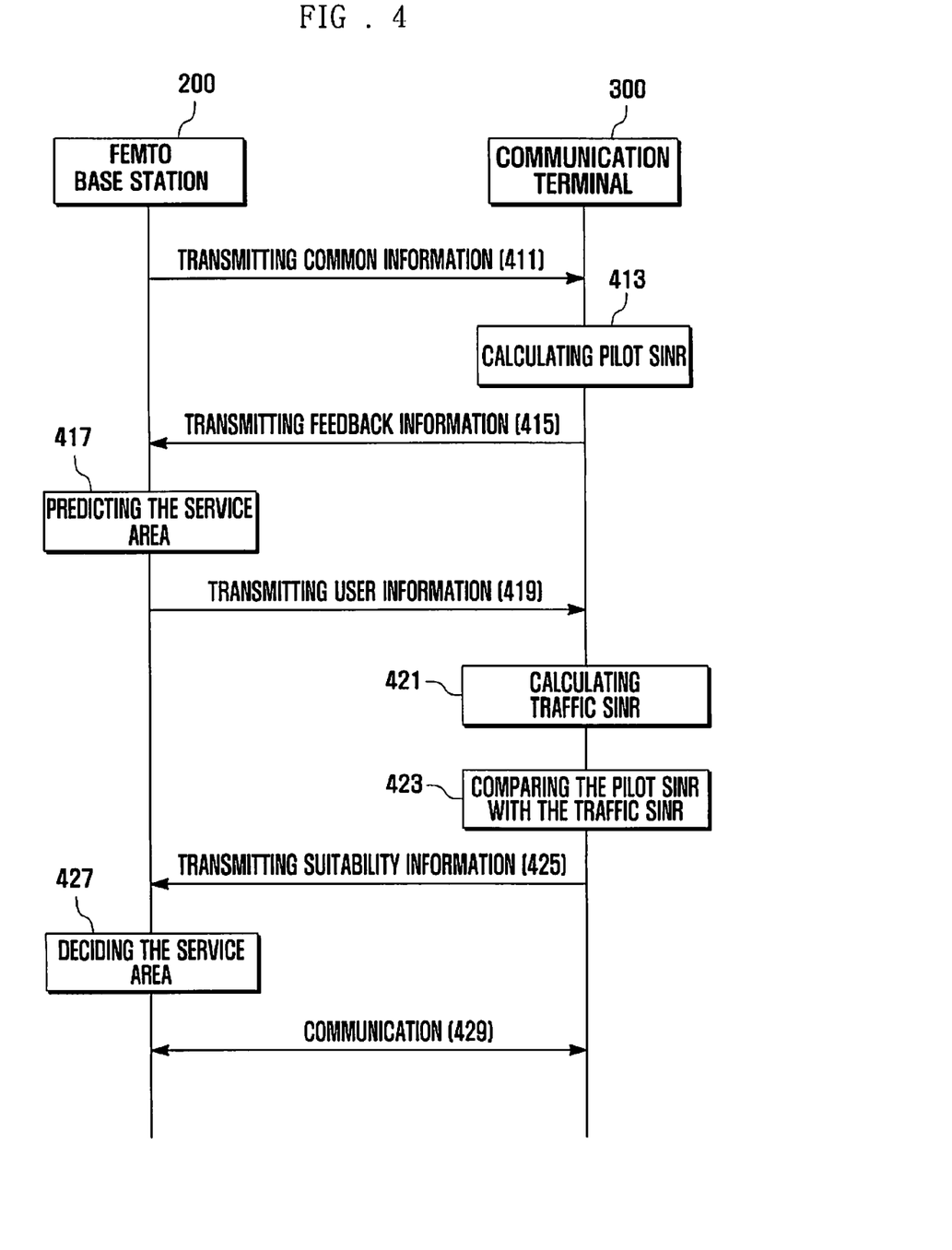
FIG. 4 is a flow chart illustrating a signal flow procedure in a communication system according to an embodiment of the present invention.

FIG. 4 is a flow chart illustrating a signal flow procedure in a communication system according to an embodiment of the present invention.

Referring to FIG. 4, the femto base station 200 transmits common information in step 411. More specifically, the femto base station 200 transmits the common information throughout the femto cell 20, i.e., to all service areas 30.

In step 413, upon receiving the common information, the communication terminal 300 calculates SINR of the common information, e.g., pilot SINR. The communication terminal 300 receives the common information through a plurality of downlink paths, and selects the common information having a maximum pilot SINR. That is, the communication terminal 300 selects an optimum downlink path between the femto base station 200 and the communication terminal 300. Using the information above, the communication terminal 300 determines a signal environment of the common information between the femto base station 200 and the communication terminal 300.

In step 415, the communication terminal 300 transmits the analysis result of the common information as feedback information. In step 417, the femto base station 200 predicts the service area 30 of the communication terminal 300 location using the feedback information.

In step 419, the femto base station 200 transmits user information to the communication terminal 300. More specifically, the femto base station 200 transmits user information to a corresponding service area 30 in the femto cell 20 in which the communication terminal is located.

In step 421, upon receiving user information, the communication terminal 300 calculates the SINR of the user information, i.e., traffic SINR. The communication terminal 300 determines the signal environment of the user information between the femto base station 200 and the communication terminal 300 using the SINR of the user information.

In step 423, the communication terminal 300 compares the pilot SINR with the traffic SINR. Based on the comparison, the communication terminal 300 determines whether the downlink paths of the common information and the user information are similar. For example, the communication terminal 300 can compare the difference of the pilot SINR and the traffic SINR or the rate of the pilot SINR and the traffic SINR, with a preset critical value.

If the pilot SINR and the traffic SINR are similar, the communication terminal 300 can determine that the downlink paths of the common information and the user information are similar. Thus, the communication terminal 300 can determine whether the downlink path of user information is suitable.

When the downlink paths of the user information and common information are similar, the communication terminal 300 can determine the downlink path of the user information is suitable.

In step 425, the communication terminal 300 transmits suitability information indicating whether the downlink path is suitable. In step 427, upon receiving the suitability information, the femto base station 200 analyzes the suitability information and decides the service area 30 of the communication terminal 300 location.

If it is determined through the suitability information that the downlink path is suitable, the femto base station 200 decides that the service area 30 predicted through feedback information corresponds to location of the communication terminal 300.

In step 429, the femto base station 200 communicates with the communication terminal 300). At this time, the femto base station 200 can transmit other user information to a corresponding service area 30.

Figure 5:
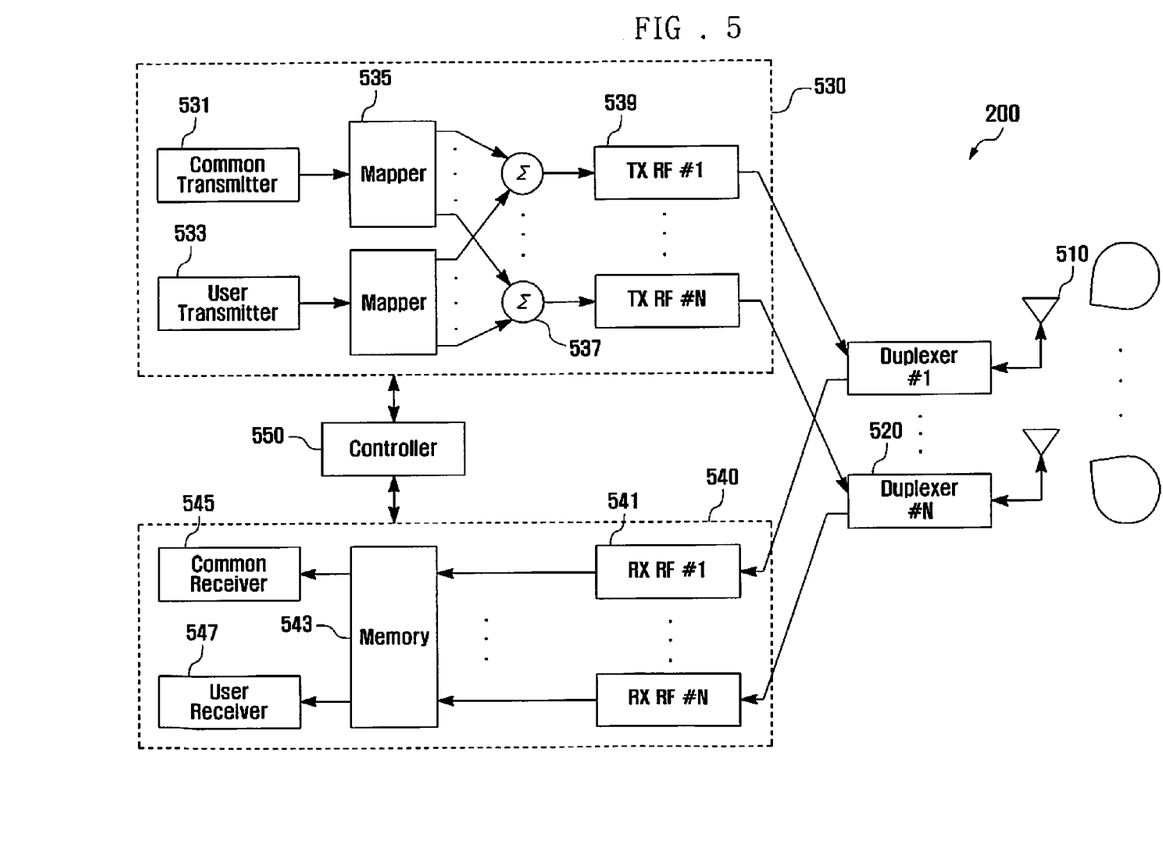
FIG. 5 is a block diagram illustrating an internal configuration of a femto base station according to an embodiment of the present invention.

FIG. 5 is a block diagram illustrating an internal configuration of a femto base station according to an embodiment of the present invention.

Referring to FIG. 5, the femto base station 200 includes a plurality of antennas 510, a plurality of duplexers 520, a transmitter 530, a receiver 540 and a controller 550. The antennas 510 send and receive signals in given frequency bands, respectively. The antennas 510 have different radiation patterns, and corresponded to different service areas 30 in the femto cell 20 individually. That is, the antennas 510 have a radiation pattern for transmitting a signal to each service area 30 and receiving a signal from each service area 30. For example, when there are N antennas 510, the femto cell 20 can be divided into N service areas 30.

The duplexer 520 supports transmission and reception of signals in each antenna 510. In FIG. 5, there are N duplexers 520, corresponding to the N antennas 510

The transmitter 530 processes a signal for transmission through at least one of the N antennas 510. The transmitter 530 includes a common transmitter 531, a user transmitter 533, a plurality of mappers 535, a plurality of adders 537, and a plurality of Radio Frequency (RF) transmitters (TX RF) 539. The common transmitter 531 generates the common information for transmitting to the femto cell 20 as a whole. The user transmitter 533 generates the user information for restrictively transmitting to a specific user area 30 for the communication terminal 300. The mapper 535 maps the common information and the user information to at least one of the antennas 510. The mapper 535 includes a common mapper for mapping the common information to the antennas 510 individually and a user mapper for mapping the user information to one of the antennas 510.

The adders 537 combine the common information with the user information so that the common information and the user information are transmitted through the same one among the antennas 510. The adders 537 are connected to the common mapper and the user mapper, respectively. As illustrated in FIG. 5, there are N adders 537 corresponding to each of the N antennas 510 individually.

The RF transmitters 539 convert at least one of the common information or the user information into a radio signal and provides to any one of the antennas 510. The RF transmitters 539 individually corresponded to each of the N antennas 510. For example, when there are N antennas 510, there are N adders 537 and N the RF transmitters 539.

The receiver 540 processes a signal received through at least one of the antennas 510. This receiver 540 includes a plurality of RF receivers (RX RF) 541, a memory 543, a common receiver 545, and a user receiver 547. The radio receivers 541 convert a radio signal received through one of the antennas 510 into the common information or the user information. The number of radio receivers 541 corresponds to the number of antennas 510. For example, when there are N antennas 510, there are also N radio receivers 541.

The memory 543 stores the common information and the user information. More specifically, the memory 543 stores at least one of the common information and the user information received through a corresponding antenna 510.

The common receiver 545 detects the common information that is received through at least one of the antennas 510 from the memory 543. Similarly, the user receiver 545 detects the user information that is received through at least one of the antennas 510 from the memory 543.

The controller 550 controls the transmitter 530 and the receiver 540. The controller 550 restrictively performs a communication for each service area 30 in the femto cell 20.

More specifically, the controller 550 determines any one of the antennas 510 as a reception antenna, when receiving the user information through any one of the antennas 510 and determines any one of the antennas 510 as a transmission antenna, to transmit the user information for a specific communication terminal 300 through the transmission antenna. Further, the controller 550 can change the transmission antenna in the antennas 510 according to a signal environment between the femto base station 200 and the communication terminal 300.

Figure 6:
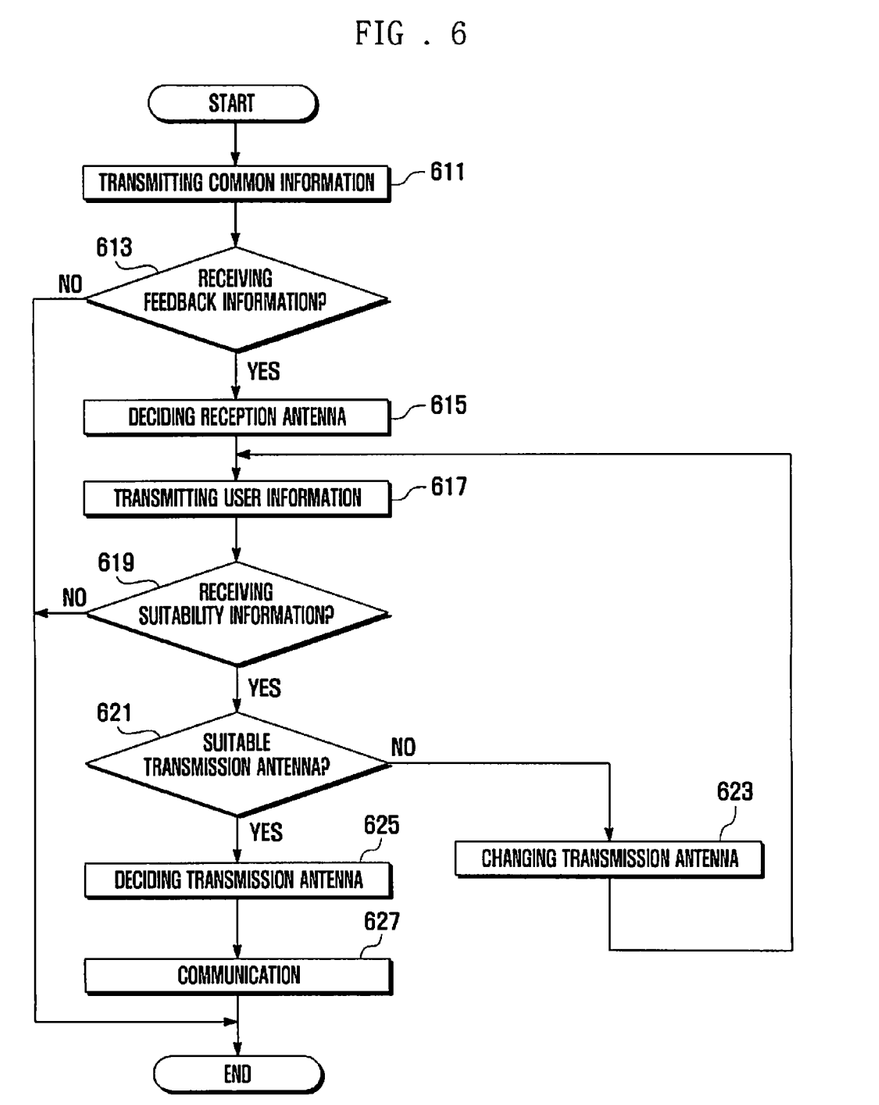
FIG. 6 is a flow chart illustrating an operation procedure of a femto base station according to an embodiment of the present invention.

FIG. 6 is a flow chart illustrating an operation procedure of a femto base station according to an embodiment of the present invention.

Referring to FIG. 6, the femto base station 200 transmits the common information in step 611. That is, the controller 550 transmits the common information to the femto cell 20 through each of the N antennas 510. More specifically, the common information is transmitted through each antenna to each corresponding user area 30, respectively, according to the radiation pattern of each antenna 510.

In step 613, the controller 550 determines whether feedback information according to the common information is received through at least one of the antennas 510, and determines which one of the antennas 510 is a reception antenna in step 615, when the common information is received. That is, the controller 550 analyzes the feedback information and decides an optimum reception antenna corresponding to the communication terminal 300.

In step 617, the controller 550 transmits the user information for a specific communication terminal 300. More specifically, the controller 550 tentatively decides the reception antenna as a transmission antenna, transmits the user information through the transmission antenna. That is, the controller 550 predicts that a service area pertinent to the reception antenna corresponds to the location of communication terminal 300. Here, according to the radiation pattern of the transmission antenna, the user information is transmitted to a specific user area 30. That is, the controller 550 restrictively transmits the user information to the service area corresponding to the transmission antenna.

In step 619, the controller 550 senses reception of suitability information, and when the suitability information is received, determines whether the transmission antenna is suitable to transmit the user information to the communication terminal 300 in step 621. When the controller 550 determines that the transmission antenna is not suitable in step 621, the controller 550 changes the transmission antenna to another antenna among the antennas 510 in step 623. The controller 550 can tentatively decide a transmission antenna by arbitrarily selecting from the antennas 510. Accordingly, until it is determined that the transmission antenna is suitable, the controller 550 repeats step 617 to step 623.

When the controller 550 determines that the transmission antenna is suitable in step 621, the controller 550 decides the transmission antenna in step 625. Specifically, the controller 550 maintains the determined antenna in step 615 as the transmission antenna. In step 627, the controller 550 communicates with the communication terminal 300 by using the transmission antenna. At this time, the controller 550 transmits the user information through the transmission antenna decided in step 625.

Figure 7:
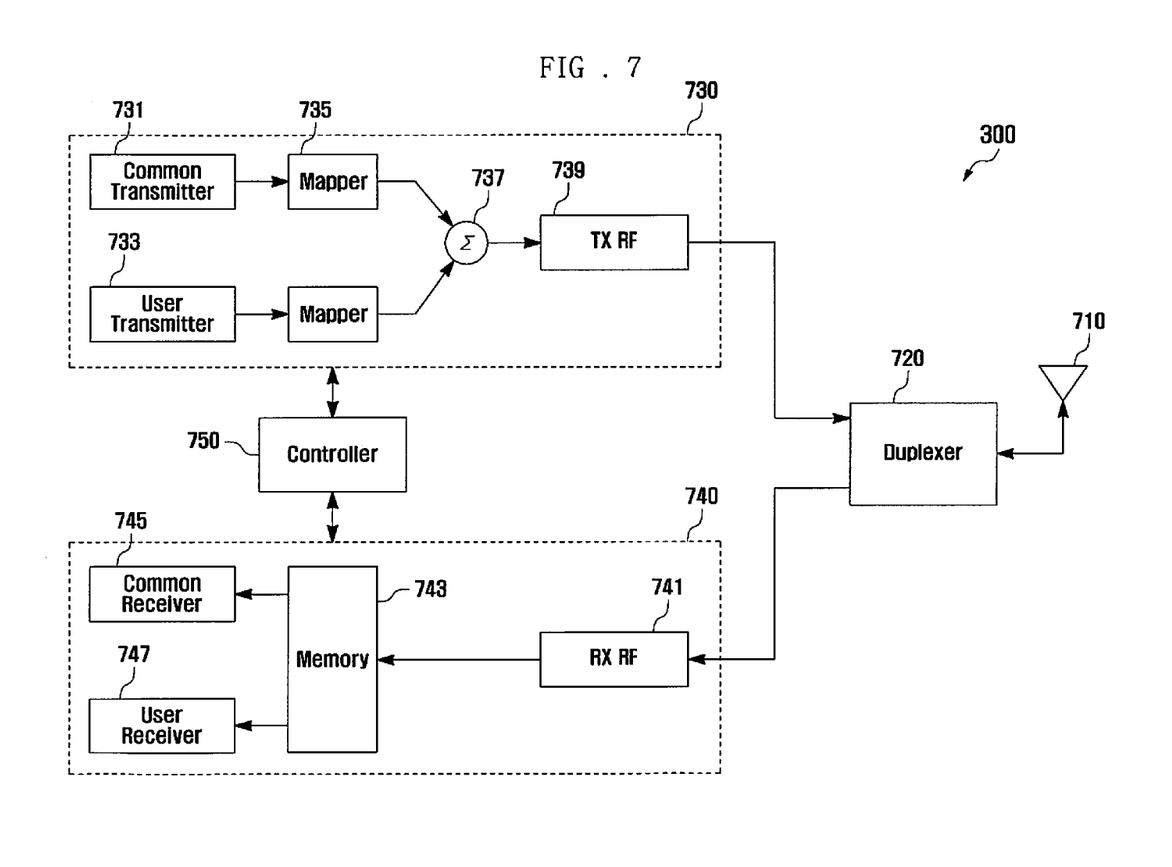
FIG. 7 is a block diagram illustrating an internal configuration of a communication terminal according to an embodiment of the present invention.

FIG. 7 is a block diagram illustrating an internal configuration of a communication terminal according to an embodiment of the present invention.

Referring to FIG. 7, the communication terminal 300 includes an antenna 710, a duplexer 720, a transmitter 730, a receiver 740, and a controller 750. The antenna 710 sends and receives signals in a given frequency band. The antenna 710 can have an omni-directional radiation pattern.

The duplexer 720 supports the antenna 710 to transmit or receive signals.

The transmitter 730 processes a signal for transmission through the antenna 710. The transmitter 730 includes a common transmitter 731, a user transmitter 733, a plurality of mapper 735, an adder 737, and an RF transmitter 739. The common transmitter 731 generates common information for transmission to the macro base station 100 or the femto base station 200. The user transmitter 733 generates user information for transmission to the macro base station 100 or the femto base station 200.

The mappers 735 map common information and user information to the antenna 710. The adder 737 combines common information with user information to transmit through the antenna 710.

The RF transmitter 739 converts one of the common information and the user information and provides it to the antenna 710.

The receiver 740 processes a signal received through the antenna 710. This receiver 740 includes an RF receiver 741, a memory 743, a common receiver 745, and a user receiver 747. The radio receiver 741 converts a radio signal received through the antenna 710 into common information or user information. The memory 743 stores common information or user information. The common receiver 745 detects common information from the memory 743, and the user receiver 747 detects user information from the memory 743.

The controller 750 controls the transmitter 730 and the receiver 740. The controller 750 can use a communication service by communicating with the macro base station 100 or the femto base station 200.

More specifically, when the communication terminal 300 receives common information, the controller 750 calculates a pilot SINR, and when the communication terminal 300 receives user information, the controller 750 calculates a traffic SINR. Moreover, the controller 750 compares the pilot SINR with the traffic SINR, and notifies a result of the comparison result to the femto base station 200.

Figure 8:
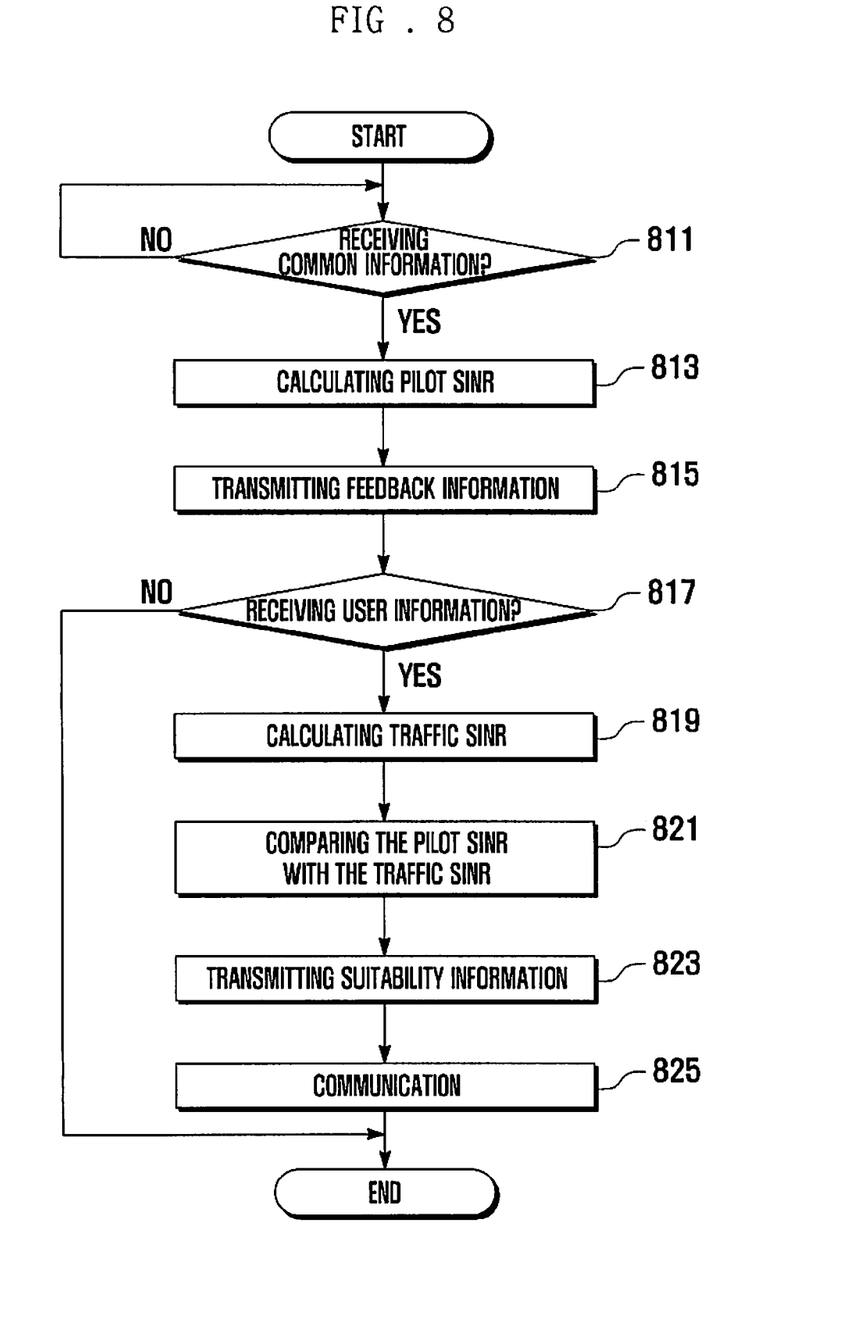
FIG. 8 is a flow chart illustrating an operation procedure of a communication terminal according to an embodiment of the present invention.

FIG. 8 is a flow chart illustrating an operation procedure of a communication terminal according to an embodiment of the present invention.

Referring to FIG. 8, when the controller 750 senses the reception of the common information from the femto base station 200 in step 811, the controller 750 calculates the SINR of common information, i.e., a pilot SINR in step 813.

The controller 750 can receive common information through a plurality of downlink paths, and can select common information which has a maximum pilot SINR. That is, the controller 750 can select the optimum downlink path between the femto base station 200 and the communication terminal 300, and can calculate the pilot SINR using Equation (1).

$$r_p = \frac{\hat{E}_{cp}}{I_o} \quad (1)$$

In Equation (1), $\hat{E}_{cp}$ indicates an energy during chip section of common information, $I_o$ indicates an energy of an interference signal. $I_o$ can be calculated using Equation (2).

$$I_o = \hat{I}_{or} + I_{oc} + N_o \quad (2)$$

In Equation (2), $\hat{I}_{or}$ indicates an energy of an interference signal received from a corresponding femto base station 200, $I_{oc}$ indicates an energy of an interference signal received from the macro base station 100 or other femto base station 200, and $N_o$ indicates a thermal noise.

In step 815, the controller 750 transmits a result the analysis of the common information to a corresponding femto base station 200 as a feedback information.

When the communication terminal 300 receives user information in step 817, the controller 750 senses the reception of user information and calculates the SINR of the user information, i.e., traffic SINR in step 819. The controller 750 can calculate the traffic SINR as shown in Equation (3).

$$r_t = \frac{\hat{E}_{ct}}{I_o} \quad (3)$$

In Equation (3), $\hat{E}_{ct}$ indicates an energy during chip section of common information, and $I_o$ indicates an energy of an interference signal. $I_o$ can be calculated as shown in Equation (4).

$$I_o = \hat{I}_{or} + I_{oc} + N_o \quad (4)$$

In Equation (3), $\hat{I}_{or}$ indicates an energy of an interference signal received from a corresponding femto base station 200, $I_{oc}$ indicates the energy of an interference signal received from the macro base station 100 or other femto base station 200, and $N_o$ indicates a thermal noise.

In step 821, the controller 750 compares the pilot SINR and the traffic SINR. More specifically, the controller 750 can compare the difference of the pilot SINR and the traffic SINR or the rate of the pilot SINR and the traffic SINR, with a preset critical value, and determines whether the transmission antenna of the femto base station 200 is suitable to transmit user information.

The controller 750 can compare the pilot SINR and the traffic SINR as shown in Equation (5).

$$\frac{r_p}{r_t} \geq \eta \quad (5)$$

In Equation (5), $\eta$ indicates a critical value.

For example, when the rate of the pilot SINR and the traffic SINR is a critical value or greater, the controller 750 can determine that the transmission antenna is suitable, because the similarity of the pilot SINR and the traffic SINR indicates that the signal environments of common information and user information, i.e., downlink path are similar. That is, if the downlink paths of common information and user information are similar, the controller 750 determines that user information is received through the optimum downlink path, and can determine that the transmission antenna is suitable.

However, when the rate of the pilot SINR and the traffic SINR is less than a critical value, the controller 750 can determine that the transmission antenna is not suitable, because the dissimilarity of the pilot SINR and the traffic SINR indicates that the signal environments of common information and user information, i.e., downlink path are dissimilar. That is, if the downlink paths of common information and user information are dissimilar, the controller 750 determines that user information is not received through the optimum downlink path, and can determine that the transmission antenna is not suitable.

In step 823, the controller 750 configures suitability information indicating whether the transmission antenna is suitable and transmits it to a corresponding femto base station 200. In step 825, the controller 750 communicates with the femto base station 200.

An example of suitability information is shown below in Table 1.

TABLE 1

| suitability information | meaning |
| --- | --- |
| 1 | suitable transmission antenna |
| 0 | non-suitable transmission antenna |

According to the above-described embodiments of the present invention, in a communication system, a femto base station transmits user information for a communication terminal through an antenna having a radiation pattern of a specific directivity, so that generation of interference can be suppressed when compared to the conventional transmission of user information. Accordingly, the quality deterioration of the conventional communication service can be suppressed in the communication system according to the above-described embodiments of the present invention.

Although certain embodiments of the present invention have been described in detail hereinabove, it should be clearly understood that many variations and modifications of the basic inventive concepts taught herein, which may appear to those skilled in the present art, will still fall within the spirit and scope of the present invention, as defined in the appended claims and the equivalents thereof.

What is claimed is:

1. A method of transmitting a signal with reduced interference in a femto base station including a plurality of antennas having different radiation patterns, the method comprising:

transmitting common information through the plurality of antennas having the different radiation patterns;

receiving feedback information corresponding to the common information;

analyzing the feedback information;

selecting one of the plurality of antennas as a trial antenna, based on a result of the analyzing;

transmitting user information through the trial antenna;

receiving suitability information corresponding to the user information;

analyzing the suitability information to determine whether the trial antenna is suitable; and determining the trial antenna as a transmission antenna, when the trial antenna is suitable.

2. The method of claim 1, further comprising:
selecting another one of the plurality of antennas as a trial antenna, when the selected trial antenna is not suitable.

3. The method of claim 2, wherein the common information is transmitted through a plurality of downlink paths corresponding to the plurality of antennas, respectively, and the feedback information indicates a downlink path having a maximum Signal to Interference and Noise Ratio (SINR) of the common information from among the plurality of downlink paths.

4. The method of claim 3, wherein the suitability information indicates a comparison result of the SINR of the common information and an SINR of the user information.

5. A method of receiving a signal with reduced interference by a communication terminal, the method comprising:
receiving common information from a femto base station including a plurality of antennas having different radiation patterns for transmitting the common information through a plurality of downlink paths;
calculating a Signal to Interference and Noise Ratio (SINR) of the common information;
detecting a downlink path having a maximum SINR of the common information from among the downlink paths;
transmitting feedback information to the femto base station, indicating the detected downlink path having the maximum SINR;
receiving user information from the femto base station through the detected downlink path;
calculating an SINR of the user information;
determining whether the detected downlink path is suitable by comparing the SINR of the common information with the SINR of the user information; and
transmitting suitability information to the base station, indicating whether or not the detected downlink path is suitable.

6. The method of claim 5, wherein the suitability information indicates that the detected downlink path is suitable when a ratio of the SINR of the common information and the SINR of the user information is at least equal to a predetermined value, and
wherein the suitability information indicates that the detected downlink path is not suitable when the ratio of the SINR of the common information and the SINR of the user information is less than the predetermined value.

7. An apparatus for transmitting a signal with reduced interference in a femto cell, the apparatus comprising:
a plurality of antennas having different radiation patterns;
a transmitter that generates common information and user information; and
a controller that transmits the common information through the plurality of antennas, analyzes feedback information in response to the common information, selects one of the plurality of antennas as a trial antenna based on the feedback information, transmits user information through the trial antenna, receives suitability information corresponding to the user information, analyzes the suitability information to determine whether the trial antenna is suitable, and determines the trial antenna as a transmission antenna, when the suitability information indicates that the trial antenna is suitable.

8. The apparatus of claim 7, wherein the controller selects another one of the plurality of antennas as a trial antenna, when the suitability information indicates that the trial antenna is not suitable.

9. The apparatus of claim 8, wherein the common information is transmitted through a plurality of downlink paths corresponding to the plurality of antennas, respectively, and the feedback information indicates a downlink path having a maximum Signal to Interference and Noise Ratio (SINR) of the common information from among the downlink paths.

10. The apparatus of claim 9, wherein the suitability information indicates a comparison result of the SINR of the common information and an SINR of the user information.

11. An apparatus for receiving a signal with reduced interference in a femto cell of a communication system, the apparatus comprising:
an antenna that receives common information from a transmission device through a plurality of downlink paths and receives user information through one of the plurality of downlink paths;
a receiver that processes the common information and the user information; and
a controller that calculates a Signal to Interference and Noise Ratio (SINR) of the common information, detects a downlink path having a maximum SINR of the common information from among the downlink paths, transmits feedback information indicating the downlink path having the maximum SINR to the transmission device, calculates an SINR of the user information, determines whether the detected downlink path is suitable by comparing the SINR of the common information with the SINR of the user information, and transmits, to the transmission device, suitability information indicating whether the detected downlink path is suitable.

12. The apparatus of claim 11, wherein the suitability information indicates that the downlink path is suitable, when a ratio of the SINR of the common information and the SINR of the user information is at least equal to a predetermined value, and
wherein the suitability information indicates that the downlink path is not suitable, when the ratio of the SINR of the common information and the SINR of the user information is less than the predetermined value.

* * * * *